US011939457B2

(12) United States Patent
Jiang et al.

(10) Patent No.: US 11,939,457 B2
(45) Date of Patent: Mar. 26, 2024

(54) POLYMER BLENDS HAVING IMPROVED THERMAL PROPERTIES

(71) Applicant: Dow Global Technologies LLC, Midland, MI (US)

(72) Inventors: Xian Jiang, Sugarland, TX (US); Yushan Hu, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 5 days.

(21) Appl. No.: 17/637,729

(22) PCT Filed: Aug. 27, 2020

(86) PCT No.: PCT/US2020/048121
§ 371 (c)(1),
(2) Date: Feb. 23, 2022

(87) PCT Pub. No.: WO2021/041618
PCT Pub. Date: Mar. 4, 2021

(65) Prior Publication Data
US 2022/0282075 A1     Sep. 8, 2022

Related U.S. Application Data

(60) Provisional application No. 62/893,364, filed on Aug. 29, 2019.

(51) Int. Cl.
*C08L 23/08* (2006.01)
*C08L 23/14* (2006.01)
*C08L 53/00* (2006.01)

(52) U.S. Cl.
CPC ....... *C08L 23/0876* (2013.01); *C08L 23/0815* (2013.01); *C08L 23/142* (2013.01); *C08L 53/00* (2013.01); *C08L 2205/03* (2013.01)

(58) Field of Classification Search
CPC combination set(s) only.
See application file for complete search history.

(56) References Cited

U.S. PATENT DOCUMENTS

| | | | |
|---|---|---|---|
| 2,897,183 | A | 7/1959 | Christl et al. |
| 3,404,134 | A | 10/1968 | Watkin |
| 5,028,674 | A | 7/1991 | Hatch et al. |
| 5,611,982 | A | 3/1997 | Mathavan et al. |
| 6,103,657 | A | 8/2000 | Murray |
| 6,320,005 | B1 | 11/2001 | Murray |
| 6,518,365 | B1 | 2/2003 | Powell et al. |
| 6,953,764 | B2 | 10/2005 | Frazier et al. |
| 7,355,089 | B2 | 4/2008 | Chang et al. |
| 7,498,282 | B2 | 3/2009 | Patel et al. |
| 2006/0199930 | A1 | 9/2006 | Li Pi Shan et al. |
| 2007/0167578 | A1 | 7/2007 | Stevans et al. |
| 2008/0269412 | A1 | 10/2008 | Carnahan et al. |
| 2008/0311812 | A1 | 12/2008 | Arriola et al. |
| 2010/0113673 | A1* | 5/2010 | Leu .......... C08K 3/346 524/445 |
| 2011/0082249 | A1 | 4/2011 | Shan et al. |
| 2011/0082257 | A1 | 4/2011 | Carnahan et al. |
| 2011/0082258 | A1 | 4/2011 | Walton et al. |
| 2011/0313106 | A1* | 12/2011 | Shan .......... C08L 23/10 525/88 |
| 2015/0274951 | A1* | 10/2015 | Hausmann .......... C08L 23/0876 264/319 |
| 2017/0355840 | A1* | 12/2017 | Hu .......... B29C 35/02 |
| 2019/0112407 | A1 | 4/2019 | Wu et al. |
| 2021/0206953 | A1 | 7/2021 | Jiang |

FOREIGN PATENT DOCUMENTS

| | | |
|---|---|---|
| CN | 107001734 A | 8/2017 |
| CN | 109195998 A | 1/2019 |
| EP | 613487 A1 | 9/1994 |
| EP | 635360 A1 | 1/1995 |
| EP | 3227380 A1 | 10/2017 |
| JP | 2000095902 A * | 4/2000 |
| WO | 2002038628 A3 | 5/2002 |
| WO | 2003040195 A1 | 5/2003 |
| WO | 2005090426 A1 | 9/2005 |
| WO | 2009012215 A1 | 1/2009 |

OTHER PUBLICATIONS

International Search Report and Written Opinion dated Nov. 18, 2020 pertaining to International Application No. PCT/2020/048121 filed Aug. 27, 2020, 13 pages.

Hasch, B. M. et al. "High-Pressure Phase Behavior of Mixtures of Poly(Ethylene-co-Methyl Acrylate) with Low-Molecular weight Hydrocarbons", Journal of Polymer Science: Part B: Polymer Physics, vol. 30, 1365-1373 (1992).

Lee, D. et al., "Development of high temperature comprehensive two-dimensional liquid chromatography hyphenated with infrared and light scattering detectors for characterization of chemical composition and molecular weight heterogeneities in polyolefin copolymers" Journal of Chromatography A, 1218, 7173-7179 (2011).

(Continued)

*Primary Examiner* — Marc S Zimmer
*Assistant Examiner* — Surbhi M Du
(74) *Attorney, Agent, or Firm* — Dinsmore & Shohl LLP

(57) ABSTRACT

Embodiments are directed to polymer blends and molded articles including polymer blends. Embodiments of the polymer blend may include 1 to 40 wt. % of a crystalline block composite and from 60 wt. % to 99 wt. % of an ionomer formed from a partially neutralized precursor acid copolymer. The crystalline block composite may include an EP-iPP diblock polymer, an isotactic polypropylene homopolymer, and a copolymer of ethylene and propylene. The crystalline block composite may include greater than 50 wt. % of the isotactic polypropylene homopolymer. The precursor acid copolymer may include copolymerized units of ethylene and 5 wt. % to 30 wt. %, based on the total weight of the precursor acid copolymer, of copolymerized units of an α,β-ethylenically unsaturated carboxylic acid having 3 to 8 carbon atoms. About 25% to about 65% of the acid groups derived from the α,β-ethylenically unsaturated carboxylic acid of the precursor acid copolymer may be neutralized.

13 Claims, No Drawings

(56) References Cited

OTHER PUBLICATIONS

Brun, Y. et al., "Characterization of synthetic copolymers by interaction polymer chromatography: Separation by microstructure" J. Sep. Sci. 2010, 33, 3501-3510.
Chinese Office Action dated Sep. 29, 2023, pertaining to CN Patent Application No. 202080059287.9, 16 pgs.
Brazil Office Action dated Oct. 31, 2023, pertaining to BR Patent Application No. 112022003180.7, 5 pgs.

* cited by examiner

POLYMER BLENDS HAVING IMPROVED THERMAL PROPERTIES

CROSS-REFERENCE TO RELATED APPLICATIONS

This application is a national-stage application under 35 U.S.C. § 371 of International Application No. PCT/US2020/048121, filed Aug. 27, 2020 which claims priority to U.S. Provisional Patent Application No. 62/893,364, filed on Aug. 29, 2019, the entire disclosures of which are hereby incorporated by reference.

TECHNICAL FIELD

Embodiments of the present disclosure generally relate to polymer blends, and more particularly to polymer blends for use in molded articles.

BACKGROUND

Glass may often be used in cosmetics packaging applications because of its scratch-resistance, transparency, hardness, and chemical resistance properties. However, glass may be relatively expensive to use, and in some cases, it can be cost prohibitive. For example, glass may be fairly dense and heavy in weight, which may therefore increase shipping costs. While glass may be fairly resistant to scratches on its surface, it is also brittle.

SUMMARY

Plastic cosmetics packaging, through the use of ionomers, may overcome some of the deficiencies of glass packaging. However, because ionomers are thermoplastic, their use may be limited by the possibility of deformation, flow, or creep under high-temperature operating conditions. For example, ionomers may be susceptible to deformation, flow, or creep during injection molding processes. Further, containers produced by injection molding processes may often have thick wall structures. When ionomers are used in forming such injection molded containers, the optical properties may suffer due to the thickness of the wall.

Accordingly, there are needs for ionomer compositions with improved heat deflection temperatures; improved stiffness and modulus (at room temperature and at elevated temperatures below the melting point of the ionomer), improved upper use temperature at a given stiffness; and improved long term creep at elevated temperatures, all of which may be improved while maintaining desired optical properties.

Embodiments of the present disclosure meet those needs by providing a polymer blend, which may include 1 to 40 wt. % of a crystalline block composite and from 60 wt. % to 99 wt. % of an ionomer formed from a partially neutralized precursor acid copolymer. In comparison to comparative ionomer compositions and blends, the presently-disclosed polymer blends may have improved heat deflection temperatures, improved stiffness and modulus (at room temperature and at elevated temperatures below the melting point of the ionomer), improved upper use temperature at a given stiffness, and improved long term creep at elevated temperatures, while maintaining desired optical properties. In embodiments, the disclosed polymer blends may be injection molded to form an article. Embodiments of the articles may be utilized for cosmetics packaging applications.

Embodiments are directed to polymer blends and molded articles including polymer blends. Embodiments of the polymer blend may include 1 to 40 wt. % of a crystalline block composite and from 60 wt. % to 99 wt. % of an ionomer formed from a partially neutralized precursor acid copolymer. The crystalline block composite may include an EP-iPP diblock polymer, an isotactic polypropylene homopolymer, and a copolymer of ethylene and propylene. The crystalline block composite may include greater than 50 wt. % of the isotactic polypropylene homopolymer. The precursor acid copolymer may include copolymerized units of ethylene and 5 wt. % to 30 wt. %, based on the total weight of the precursor acid copolymer, of copolymerized units of an α,β-ethylenically unsaturated carboxylic acid having 3 to 8 carbon atoms. About 25% to about 65% of the acid groups derived from the α,β-ethylenically unsaturated carboxylic acid of the precursor acid copolymer may be neutralized.

These and other embodiments are described in more detail in the following Detailed Description.

DETAILED DESCRIPTION

Specific embodiments of the present application will now be described. These embodiments are provided so that this disclosure will be thorough and complete and will fully convey the scope of the claimed subject matter to those skilled in the art.

Unless stated to the contrary, implicit from the context, or customary in the art, all parts and percent values are based on weight, all temperatures are in ° C., and all test methods are current as of the filing date of this disclosure.

The term "polymer" refers to a polymeric compound prepared by polymerizing monomers, whether of a same or a different type. The generic term polymer thus embraces the term "homopolymer," which usually refers to a polymer prepared from only one type of monomer as well as "copolymer," which refers to a polymer prepared from two or more different monomers. The term "interpolymer," as used herein, refers to a polymer prepared by the polymerization of at least two different types of monomers. The generic term interpolymer thus includes a copolymer or polymer prepared from more than two different types of monomers, such as terpolymers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of ethylene-based polymers known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "composition," as used herein, refers to a mixture of materials which comprises the composition, as well as reaction products and decomposition products formed from the materials of the composition.

"Polypropylene" or "propylene-based polymer" as used herein, refers to a polymer that comprises, in polymerized form, refers to polymers comprising greater than 50% by mole of units which have been derived from propylene monomer. This includes propylene homopolymer, random copolymer polypropylene, impact copolymer polypropylene, propylene/α-olefin copolymer, and propylene/α-olefin copolymer.

"Blend," "polymer blend," and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The term "crystalline" refers to a polymer or polymer block that possesses a first order transition or crystalline melting point ($T_m$) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers typically have, but are not limited to, densities of 0.88 g/cc to 0.91 g/cc and melting points of 100° C. to 170° C.

The term "amorphous" refers to a polymer lacking a crystalline melting point.

The term "isotactic" refers to polymer repeat units having at least 70 percent isotactic pentads as determined by 13C-NMR analysis. "Highly isotactic" is defined as polymers having at least 90 percent isotactic pentads.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Polymer Blend

Reference will now be made in detail to embodiments of a polymer blend as further described herein. In embodiments, the polymer blend may include a crystalline block composite and an ionomer.

Embodiments of the polymer blend may include from about 1 wt. % to about 40 wt. % of the crystalline block composite based on the total weight of the polymer blend. In some embodiments, the polymer blend may include from about 1 wt. % to about 30 wt. %, 1 wt. % to about 20 wt. %, from about 1 wt. % to about 10 wt. %, from about 1 wt. % to about 5 wt. %, from about 5 wt. % to about 30 wt. %, from about 5 wt. % to about 20 wt. %, from about 5 wt. % to about 15 wt. %, from about 5 wt. % to about 10 wt. %, from about 10 wt. % to about 30 wt. %, from about 10 wt. % to about 20 wt. %, from about 20 wt. % to about 30 wt. % of the crystalline block composite based on the total weight of the polymer blend.

Embodiments of the polymer blend may include from 60 wt. % to 99 wt. %, based on the total weight of the polymer blend, of an ionomer formed from a partially neutralized precursor acid copolymer. In some embodiments, the polymer blend may include from about 60 wt. % to about 90 wt. %, from about 60 wt. % to about 80 wt. %, from about 60 wt. % to about 70 wt. %, from about 70 wt. % to about 99 wt. %, from about 70 wt. % to about 90 wt. %, from about 70 wt. % to about 80 wt. %, from about 80 wt. % to about 99 wt. %, from about 80 wt. % to about 90 wt. %, from about 85 wt. % to about 95 wt. %, or from about 90 wt. % to about 99 wt. % of the ionomer based on the total weight of the polymer blend.

Crystalline Block Composite

Reference will now be made in detail to embodiments of the crystalline block composite of the polymer blend described herein. The term "crystalline block composite" (CBC) refers to polymers comprising a EP-iPP diblock polymer, iPP, and EP, where iPP may refer to isotactic polypropylene homopolymer, and EP may refer to a copolymer of ethylene and propylene.

In embodiments, the crystalline block composite may include greater than 50 wt. % of isotactic polypropylene based on the total weight crystalline block composite. That is, the crystalline block composite may include greater than 50 wt. % or 60 wt. % of isotactic polypropylene based on the isotactic polypropylene comprised in the EP-iPP diblock polymer and the isotactic polypropylene homopolymer of the crystalline block composite. In other embodiments, the crystalline block composite may include from about 55 wt. % to about 85 wt. % or from about 60 wt. % to about 75 wt. % of isotactic polypropylene based on the total weight crystalline block composite. Without being bound by theory, it was surprisingly discovered that including greater than 50 wt. % of isotactic polypropylene yields a product with improved balance of heat deflection temperature, oven creep resistance, and optical performance (e.g., clarity).

In embodiments, the crystalline block composite may have a melt flow rate, MFR, (according to ASTM D1238 at 230° C., 2.16 kg) of from about 2 g/10 min to about 50 g/10 min. In some embodiments, the crystalline block composite may have a melt flow rate, MFR, (according to ASTM D1238 at 230° C., 2.16 kg) of from about 2 g/10 min to about 25 g/10 min, from about 2 g/10 min to about 10 g/10 min, from about 2 g/10 min to about 5 g/10 min, from about 5 g/10 min to about 50 g/10 min, from about 5 g/10 min to about 25 g/10 min, from about 5 g/10 min to about 10 g/10 min, from about 10 g/10 min to about 50 g/10 min, from about 10 g/10 min to about 25 g/10 min, from about 10 g/10 min to about 50 g/10 min, from about 10 g/10 min to about 25 g/10 min, or from about 25 g/10 min to about 50 g/10 min.

The crystalline block composite polymers are preferably prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions. In a preferred embodiment, the block composites may comprise a fraction of block polymer which possesses a most probable distribution of block lengths.

Suitable processes useful in producing the crystalline block composites may be found, for example, in US Patent Application Publication No. 2008/0269412, published on Oct. 30, 2008, which is herein incorporated by reference. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Moreover, as previously explained, the chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

Suitable catalysts and catalyst precursors may include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts. Particularly preferred catalysts are those of the following formula:

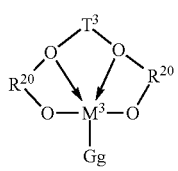

wherein: $R^{20}$ is an aromatic or inertly substituted aromatic group containing from 5 to 20 atoms not counting hydrogen, or a polyvalent derivative thereof; $T^3$ is a hydrocarbylene or silane group having from 1 to 20 atoms not counting hydrogen, or an inertly substituted derivative thereof; $M^3$ is a Group 4 metal, preferably zirconium or hafnium; G is an anionic, neutral or dianionic ligand group; preferably a halide, hydrocarbyl or dihydrocarbylamide group having up to 20 atoms not counting hydrogen; g is a number from 1 to 5 indicating the number of such G groups; and bonds and electron donative interactions are represented by lines and arrows respectively.

Preferably, such complexes correspond to the formula:

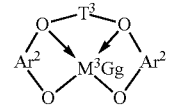

wherein: $T^3$ is a divalent bridging group of from 2 to 20 atoms not counting hydrogen, preferably a substituted or unsubstituted, C3-6 alkylene group; and $Ar^2$ independently each occurrence is an arylene or an alkyl- or aryl-substituted arylene group of from 6 to 20 atoms not counting hydrogen; $M^3$ is a Group 4 metal, preferably hafnium or zirconium; G independently each occurrence is an anionic, neutral or dianionic ligand group; g is a number from 1 to 5 indicating the number of such X groups; and electron donative interactions are represented by arrows.

Preferred examples of metal complexes of foregoing formula include the following compounds:

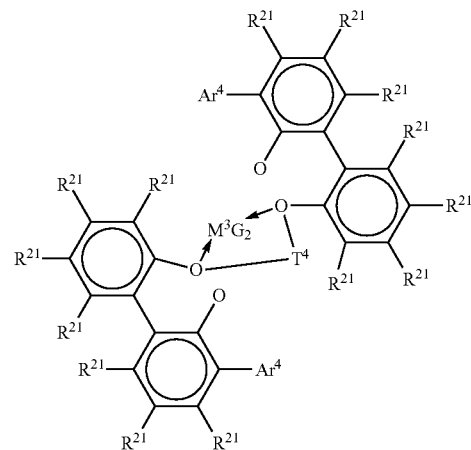

where $M^3$ is Hf or Zr; $Ar^4$ is C6-20 aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence comprises a C3-6 alkylene group, a C3-6 cycloalkylene group, or an inertly substituted derivative thereof; $R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

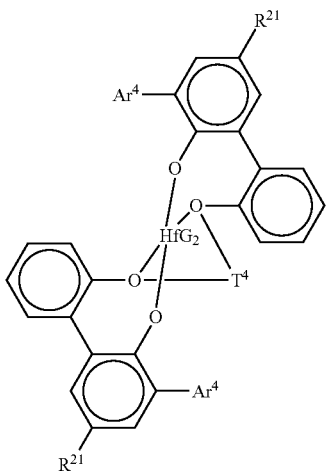

wherein Ar4 is 3,5-di(isopropyl)phenyl, 3,5-di(isobutyl)phenyl, dibenzo-1H-pyrrole-1-yl, or anthracen-5-yl, $R^{21}$ is hydrogen, halo, or C1-4 alkyl, especially methyl, $T^4$ is propan-1,3-diyl or butan-1,4-diyl, and G is chloro, methyl or benzyl.

Other suitable metal complexes are those of the formula:

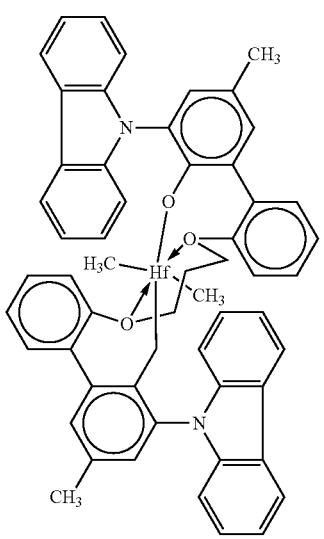

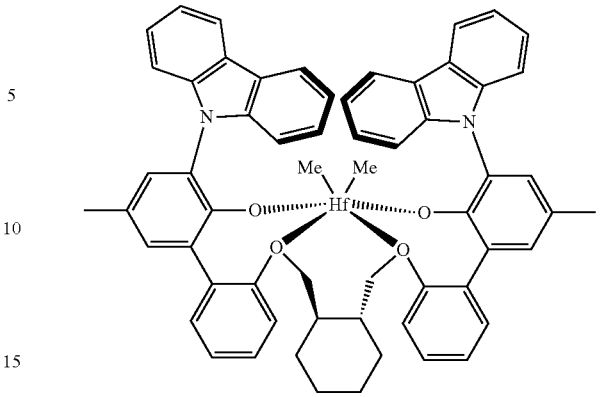

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, 6,953,764 and International Publication Nos WO 02/38628 and WO 03/40195.

Suitable co-catalysts are those disclosed in WO2005/090426, in particular, those disclosed on page 54, line 1 to page 60, line 12, which is herein incorporated by reference.

Suitable chain shuttling agents are those disclosed in WO2005/090426, in particular, those disclosed on page 19, line 21 through page 20 line 12, which is herein incorporated by reference. Particularly preferred chain shuttling agents are dialkyl zinc compounds.

The crystalline block composites preferably have a Tm greater than 100° C., preferably greater than 120° C., and more preferably greater than 125° C. Preferably the Tm is in the range of from 100° C. to 250° C., more preferably from 120° C. to 220° C. and also preferably in the range of from 125° C. to 220° C. Preferably the MFR of the crystalline block composites is from 0.1 to 1000 dg/min, more preferably from 0.1 to 50 dg/min and more preferably from 0.1 to 30 dg/min.

Further preferably, the crystalline block composites have a weight average molecular weight (Mw) from 10,000 to about 2,500,000, preferably from 35,000 to about 1,000,000 and more preferably from 50,000 to about 300,000, preferably from 50,000 to about 200,000.

Preferred suitable CBC resin(s) will have heat of fusion values at least about 50 Joules per gram (J/g), more preferably at least about 75 J/g, still more preferably at least about 85 J/g, and most preferably at least about 90 J/g, as measured by DSC.

In embodiments, the crystalline block composite may exhibit a refractive index (RI) of 1.49 to 1.52 as determined according to the methods described herein. In some embodiments, the crystalline block composite may exhibit a refractive index (RI) of 1.49 to 1.51.

Ionomer

Reference will now be made to embodiments of the ionomer of the polymer blend. Disclosed in embodiments herein is an ionomer formed from a partially neutralized precursor acid copolymer.

The precursor acid copolymer comprises copolymerized units of ethylene and from about 5 wt. % to about 30 wt. %, based on the total weight of the precursor acid copolymer, of copolymerized units of an α,β-ethylenically unsaturated carboxylic acid having 3 to 8 carbon atoms. All individual values and subranges of from about 5 wt. % to about 30 wt. % are included and disclosed herein. For example, in some embodiments, the precursor acid copolymer (a) comprises copolymerized units of ethylene and from about 5 wt. % to about 25 wt. %, from about 7 wt. % to about 25 wt. %, or from about 7 wt. % to about 22 wt. %, based on the total wt. % of the precursor acid copolymer, of copolymerized units of an α,β-ethylenically unsaturated carboxylic acid having 3 to 8 carbon atoms. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Examples of suitable α,β-unsaturated carboxylic acids having 3 to 8 carbon atoms may include, without limitation, acrylic acids, methacrylic acids, itaconic acids, maleic acids, fumaric acids, monomethyl maleic acids, and combinations of two or more of these acid comonomers. In some embodiments, the α,β-unsaturated carboxylic acids having 3 to 8 carbon atoms comprises acrylic acid and methacrylic acid. In other embodiments, the α,β-unsaturated carboxylic acids having 3 to 8 carbon atoms comprises acrylic acid.

The precursor acid copolymer has a melt index, $I_2$, of from about 10 g/10 min to about 4,000 g/10 min. The melt index, $I_2$, is determined according to ASTM D1238 at 190° C., 2.16 kg. All individual values and subranges of 10 g/10 min to 4,000 g/10 min are included and disclosed herein. For examples, in some embodiments, the precursor acid copolymer may have a melt index, $I_2$, of from about 10 g/10 min to about 2,500 g/10 min, from about 10 g/10 min to about 1,250 g/10 min, from about 25 g/10 min to about 1,000 g/10 min, from about 25 g/10 min to about 750 g/10 min, from about 50 g/10 min to about 500 g/10 min, or from about 100 g/10 min to about 450 g/10 min.

The precursor acid copolymers may be synthesized in a continuous process in which each of the reactive comonomers and the solvent(s), if any, are continuously fed, together with initiator, into a stirred reactor. The choice of initiator is based on the anticipated reactor temperature range coupled with the decomposition temperature of the initiator, the criteria for this selection being well-understood in the industry. In general, during the synthesis by copolymerization of ethylene and acid comonomers to produce the precursor acid copolymer, the reaction temperature may be maintained at about 120° C. to about 300° C., or about 140° C. to about 260° C. The pressure in the reactor may be maintained at about 130 MPa to about 310 MPa, or about 165 MPa to 250 MPa.

The reactor may be, for example, an autoclave reactor, such as those described in U.S. Pat. No. 2,897,183, which describes a type of autoclave reactor that is equipped with means for intensive agitation. The patent also describes a continuous process for the polymerization of ethylene under a "substantially constant environment." This environment is maintained by keeping certain parameters, for example, pressure, temperature, initiator concentration, and the ratio of polymer product to unreacted ethylene, substantially constant during the polymerization reaction. Such conditions may be achieved in any of a variety of continuously stirred tank reactors, among them, for example, continuously stirred isothermal reactors and continuously stirred adiabatic reactors.

The reaction mixture, which contains the precursor acid copolymer, is vigorously agitated and continuously removed from the autoclave. After the reaction mixture leaves the reaction vessel, the resulting precursor acid copolymer product is separated from the volatile unreacted monomers and solvent(s), if any, by conventional procedures, such as by vaporizing the unpolymerized materials and solvent(s) under reduced pressure or at an elevated temperature. Non-limiting examples of precursor acid copolymers include NUCREL™ 0403, 0903, or 0910, available from The Dow Chemical Company, Midland, Mich.

In general, to obtain the ionomers described herein, during the polymerization reaction, the reactor contents should be maintained under conditions such that a single phase is present substantially throughout the reactor. This can be accomplished by adjusting reactor temperature, by adjusting reactor pressure, by addition of co-solvents, or by any combination of these techniques, as described in U.S. Pat. No. 5,028,674. Conventional means may be used to determine whether a single phase is maintained substantially throughout the reactor. For example, Hasch et al., in "High-Pressure Phase Behavior of Mixtures of Poly(Ethylene-co-Methyl Acrylate) with Low-Molecular Weight Hydrocarbons," Journal of Polymer Science: Part B: Polymer Physics, Vol. 30, 1365-1373 (1992), describe a cloud-point measurement that can be used in determining the boundary between single phase and multiphase conditions.

To obtain the ionomers useful in the blends described herein, the precursor acid copolymers are neutralized with a base comprising a metal cation such that the acid groups (e.g., carboxylic acid) in the precursor acid copolymer react to form acid salt groups (e.g., carboxylate salts). In embodiments herein, about 25% to about 65%, or about 30% to about 60%, or about 35% to about 60%, or about 30% to about 55%, or about 35% to about 55% of the acid groups derived from the α,β-ethylenically unsaturated carboxylic acid of the precursor acid copolymer are neutralized. The neutralization level of the acid groups derived from the α,β-ethylenically unsaturated carboxylic acid of the precursor acid copolymer may be calculated based on the amount of basic metal compound added or measured using infra-red spectroscopy. Actual neutralization levels may be determined using infra-red spectroscopy by comparing an absorption peak attributable to carboxylate anion stretching vibrations at 1530 to 1630 $cm^{-1}$ and an absorption peak attributable to carbonyl stretching vibrations at 1690 to 1710 $cm^{-1}$. The amount of basic metal compound capable of neutralizing acidic groups may be provided by adding the stoichiometric amount of the basic compound calculated to neutralize a target amount of acid moieties in the acid copolymer. Non-limiting examples of ionomers include SURLYN™ products, available from The Dow Chemical Company, Midland, Mich.

Any stable cation and any combination of two or more stable cations are believed to be suitable as counterions to the acid groups in the ionomer. Divalent and monovalent cations, such as cations of alkali metals, alkaline earth metals, and some transition metals, may be used. In some embodiments, the cation is a divalent cation (e.g., such as, zinc, calcium, or magnesium). In other embodiments, the cation is a monovalent cation (e.g., potassium or sodium). In further embodiments, the acid groups derived from the α,β-ethylenically unsaturated carboxylic acid of the precursor acid copolymer are neutralized by a sodium-ion-containing base. This can provide a sodium ionomer wherein the hydrogen atoms of the acid groups of the precursor acid are replaced by sodium cations. To obtain the ionomers used herein, the precursor acid copolymers may be neutralized by any conventional procedure, such as those described in U.S. Pat. Nos. 3,404,134 and 6,518,365.

The ionomer may have a melt index, $I_2$, of 0.1 g/10 min to 50 g/10 min according to ASTM D1238 at 190° C., 2.16 kg. All individual values and subranges of 0.1 g/10 min to 50 g/10 min are included and disclosed herein. For example, in some embodiments, the ionomer may have a melt index, $I_2$, of from about 0.1 g/10 min to about 50 g/10 min, from about 0.1 g/10 min to about 25 g/10 min, from about 0.1 g/10 min to about 10 g/10 min, from about 0.1 g/10 min to about 5 g/10 min, from about 0.1 g/10 min to about 1 g/10 min, from about 1 g/10 min to about 50 g/10 min, from about 1 g/10 min to about 25 g/10 min, from about 1 g/10 min to about 10 g/10 min, from about 1 g/10 min to about 5 g/10 min, from about 5 g/10 min to about 50 g/10 min, from about 5 g/10 min to about 25 g/10 min, from about 5 g/10 min to about 10 g/10 min, from about 10 g/10 min to about 50 g/10 min, from about 10 g/10 min to about 25 g/10 min, or from about 25 g/10 min to about 50 g/10 min.

Molded Articles

Embodiments of the present disclosure may include a molded article comprising the polymer blend described herein.

The polymer blend may be injection molded, compression molded, or blow molded into articles for use as cosmetic containers (e.g., caps, bottles, tubs or thick-walled containers). It is noted, however, that these are merely illustrative implementations of the embodiments described herein. The embodiments are applicable to other technologies that are susceptible to similar problems as those discussed above. For example, the molded articles described herein may be used in other applications, such as, cell phone covers and cases, and automotive interior components.

The molded article is formed from the blends described herein, and may be formed using processes, such as, injection molding, blow molding, transfer molding, casting, extrusion molding, overmolding, compression molding, or cavity molding the composition. In some embodiments, the molded article is an injection molded article. In other embodiments, the molded article is a compression molded article.

In embodiments, the molded article may exhibit an internal haze of less than or equal to 60% as determined according to ASTM D1003. In some embodiments, the molded article may exhibit an internal haze of less than 50%, 25%, 20%, or 15% when determined according to ASTM D1003.

In embodiments, the molded article may exhibit an oven creep of less than 150% elongation after 160 minutes as determined according to the methods described herein. In some embodiments, the molded article may exhibit an oven creep of less than 140%, 130%, or 120% elongation after 160 minutes.

In embodiments, the molded article may exhibit a tensile strength of at least 25 MPa as determined according to ISO 527. In some embodiments, the molded article may exhibit a tensile strength of at least 29 MPa or at least 30 MPa.

In embodiments, the molded article may exhibit a heat deflection temperature (HDT) of greater than 35° C. according ISO 75 using a 0.45 MPa load. In some embodiments, the molded article may exhibit a heat deflection temperature (HDT) of greater than 40° C. or 45° C. according ISO 75 using a 0.45 MPa load The embodiments described herein may be further illustrated by the following non-limiting examples.

TEST METHODS

Unless otherwise stated, the following test methods are used.

Density

Density is determined according to ASTM D792 and reported in grams per cubic centimeter (or g/cc).

Melt Index

Melt index, or $I_2$, is determined according to ASTM D1238 at 190° C., 2.16 kg and reported in grams per ten minutes (or g/10 min).

Melt Flow Rate

Melt flow rate, or MFR, is determined according to ASTM D1238 at 230° C., 2.16 kg and reported in grams per ten minutes (or g/10 min).

Internal Haze

Internal haze is determined according to ASTM D1003, and reported in %. The samples are compression molded at 210° C. into 6 in.×6 in.×10 mil. (L×W×T) films by a hot press and then cooled down to room temperature by water cooling for the haze measurement.

Oven Creep Test

Film samples having a thickness of 10 mils, a length of three inches, and a width of one inch are prepared by compression molding at 210° C. The film samples are suspended in an oven at a temperature 85° C., and a 30-gram weight is attached to a film sample. The % dimensional change is calculated by the change of film length divided by the original film length, and is determined at 30 minutes time intervals for a period between 0 and 240 minutes. Test failure occurs if the film elongates to the point of touching the bottom of the oven (i.e., 1200% dimensional change).

Heat Deflection Temperature (HDT)

HDT is determined according to ISO 75 using a 0.45 MPa load and is reported in ° C.

Tensile Properties

The tensile strength, tensile modulus and elongation at break are measured according to ISO 527. Type 1A testing bars are injection molded for the tensile measurements.

Refractive Index

Refractive index is measured using a Metricon model 2010/M prism coupler using a 632.8 nm HeNe laser at ambient temperature and humidity using compression molded plaques (6 mil). The materials are molded at temperatures of 190° C. to 210° C. against a PET (Mylar) sheet for a smooth surface. Quench cooling may used, which means the molten plaques are transferred to platens equipped with cooling system for quenching.

Differential Scanning Calorimetry (DSC)

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. The heat of fusion (Hf) (also known as melt enthalpy) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, The Basis of Thermal Analysis, in Thermal Characterization of Polymeric Materials 92,277-278 (Edith A. Turi ed., 2d ed. 1997).

Crystallization temperature, Tc, is determined from a DSC cooling curve as above except the tangent line is drawn on the high temperature side of the crystallization peak. Where this tangent intersects the baseline is the extrapolated onset of crystallization (Tc).

Gel Permeation Chromatography (GPC)

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four Mixed A LS 30 cm, 20 micron columns. The solvent is nitrogen-purged 1,2,4-trichlorobenzene (TCB) containing approximately 200 ppm 2,6-di-t-butyl-4-methylphenol (BHT). The flow rate is 1.0 mL/min, and the injection volume is 200 μl. A "2 mg/mL" sample concentration is prepared by dissolving the sample in N2 purged and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N. Y. Hellman, & P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}} \quad \text{(EQ. 1)}$$

where $M_{PP}$ is PP equivalent MW, MPS is PS equivalent MW, log K and a values of Mark-Houwink coefficients for PP and PS are listed below.

TABLE 1

| Polymer | a | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\Sigma^i W f_i}{\Sigma^i (W f_i / M_i)} \quad \text{(EQ. 2)}$$

$$M_w = \frac{\Sigma^i (W f_i * M_i)}{\Sigma^i (W f_i)} \quad \text{(EQ. 3)}$$

where $W_{fi}$ and $M_i$ are the weight fraction and molecular weight of elution component i, respectively.

High Temperature Liquid Chromatography (HTLC)

High Temperature Liquid Chromatography (HTLC) Experimental Method Instrumentation is performed according to the published method of D. Lee et al., J. Chromatogr. A 2011, 1218, 7173, with minor modifications. Two Shimadzu (Columbia, Md, USA) LC-20AD pumps are used to deliver decane and trichlorobenzene (TCB), respectively. Each pump is connected to a 10:1 fixed flow splitter (Part #: 620-PO20-HS, Analytical Scientific Instruments Inc., CA, USA). The splitter has a pressure drop of 1500 psi (10.34 MPa) at 0.1 mL/min in H2O according to the manufacturer. The flow rate of both pumps is set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-μl mixer (Shimadzu) is connected after the splitters to mix the solvents from the Shimadzu pumps. The mixed solvents are then delivered to the injector in the oven of Waters (Milford, Mass., USA) GPCV2000. A Hypercarb™ column (2.1×100 mm, 5 µm particle size) is connected between the injector and a 10-port VICI valve (Houston, Tex., USA). The valve is equipped with two 60-µl sample loops. The valve is used to continuously sample eluent from the first dimension (D1) HTLC column to the second dimension (D2) SEC column. The pump of Waters GPCV2000 and a PLgel Rapid™-M column (10×100 mm, 5 µm particle size) are connected to the VICI valve for D2 size exclusion chromatography (SEC). The symmetric configuration is used for the connections as described in the literature (Y. Brun & P. Foster, J. Sep. Sci. 2010, 33, 3501). A dual-angle light scattering detector (PD2040, Agilent, Santa Clara, Calif., USA) and an IR5 inferred absorbance detector are connected after the SEC column for measurement of concentration, composition, and molecular weight.

Separation for HTLC: Approximately 30 mg are dissolved in 8-mL decane by gently shaking the vial at 160° C. for 2 hours. The decane contains 400 ppm BHT(2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IR5 detectors are maintained at 140° C. throughout the separation.

The initial conditions before injection are as follows: flow rate for the HTLC column is 0.01 mL/min; solvent composition in the D1 Hypercarb column is 100% decane; flow rate for the SEC column is 2.51 mL/min at room temperature; solvent composition in the D2 PLgel column is 100% TCB; solvent composition in the D2 SEC column does not change throughout the separation.

A 311-µl aliquot of sample solution is injected into the HTLC column. The injection triggers the gradient described below:

from 0-10 min, 100% decane/0% TCB;
from 10-651 min, TCB is increased linearly from 0% TCB to 80% TCB.

The injection also triggers the collection of the light scattering signal at 15° angle (LS15) and the "measure" and "methyl" signals from IR5 detector (IRmeasure and IRmethyl) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min. Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC: The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit is adjusted to repeat the process.

Each SEC chromatogram n from 1 to 217 yields an X-Y pair in the HTLC chromatogram, where n is the fraction number:

$X_n$=elution volume (mL)=D1 flow rate×n×$t_{switch}$ where $t_{switch}$=3 min is the switch time of the 10-port VICI valve $$Y_n = \text{signal intensity (Voltage)} = \sum_{peak\ start}^{peak\ end} IR_{measure,n}.$$

The above equation uses $IR_{measure}$ signal as the example. The obtained HTLC chromatogram shows the concentrations of the separated polymeric components as a function of elution volume.

X-Y pairs of data are also obtained from $IR_{methyl}$ and LS15 signals. The ratio of $IR_{methyl}/IR_{measure}$ is used to calculate composition after calibration. The ratio of LS15/$IR_{measure}$ is used to calculate weight-average molecular weight ($M_w$) after calibration.

Calibration follows the procedures of Lee et al. HDPE, isotactic polypropylene (iPP), and ethylene/propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, $\Omega$, is determined from the total LS15 signals ($A_{LS15}$) and the total $IR_{measure}$ signals ($A_{IR,measure}$):

$$\Omega = \frac{A_{LS15}}{A_{IR,measure}M_w} \quad \text{(EQ. 4)}$$

The experimental LS15/$IR_{measure}$ ratio is then converted to $M_w$ through $\Omega$.

C13 Nuclear Magnetic Resonance (NMR)

Sample Preparation: samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters: data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non-spinning samples in locked mode. Samples are homogenized immediately prior to insertion into the heated (130° C.) NMR Sample changer, and are allowed to thermally equilibrate in the probe for 15 minutes prior to data acquisition. The NMR may be used to determine total weight percent of ethylene, e.g., with respect to the crystalline block composite index or block composite index discussed below

EXAMPLES

Example 1—CBC1

CBC1 is a crystalline block composite that includes 50 wt % of a crystalline ethylene-propylene copolymer (having an ethylene content of 92 wt %) and 50 wt % of an isotactic polypropylene, based on the total weight of CBC1.

CBC1 was prepared using two continuous stirred tank reactors (CSTR) connected in series. The first reactor was approximately 12 gallons in volume while the second reactor was approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 2. The first reactor contents as described in Table 2 flow to a second reactor in series. Additional monomers, solvent, hydrogen, catalyst-1, cocatalyst-1, and optionally, cocatalyst-2, are added to the second reactor.

Catalyst-1 ([[rel-2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium) and cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane (MMAO)) were purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

CBC1 is characterized as appropriate by Differential Scanning Calorimetry (DSC), C13 Nuclear Magnetic Resonance (NMR), Gel Permeation Chromatography (GPC), and high temperature liquid chromatography (HTLC) fractionation. These are described in more detail in US Patent Application Publication Nos. 2011/0082257, 2011/0082258 and 2011/0082249, each published on 7 Apr. 2011 and incorporated herein by reference with respect to descriptions of the analysis methods. The measured properties of CBC1 are provided in Table 3.

TABLE 2

Reactor process conditions to produce crystalline block composite CBC1.

| Reactor | CBC1 | |
|---|---|---|
| | 1st Reactor | 2nd Reactor |
| Reactor Control Temp.(° C.) | 153 | 130 |
| Solvent Feed (lb/hr) | 343 | 101 |
| Propylene Feed (lb/hr) | 3.4 | 44.1 |
| Ethylene Feed (lb/hr) | 41.7 | 0 |
| Hydrogen Feed (SCCM) | 0 | 0 |
| Reactor Propylene Conc. (g/L) | — | 2.42 |
| Catalyst Efficiency (gPoly/gM) *1.0E6 | 0.247 | 0.138 |
| Catalyst Flow (lb/hr) | 0.31 | 0.53 |
| Catalyst Conc. (ppm) | 600 | 600 |
| Cocatalyst-1 Flow (lb/hr) | 0.62 | 0.53 |
| Cocatalyst-1 Conc. (ppm) | 2729 | 7082 |
| Cocat.-2 Flow (lb/hr) | 0.72 | 0.73 |
| Cocat.-2 Conc. (ppm) | 3442 | 1893 |
| DEZ Flow (lb/hr) | 1.49 | 0 |
| DEZ Conc. (ppm) | 30000 | 0 |

TABLE 3

Measured properties of CBC1.

| | MFR (230° C./ 2.16 kg) (g/10 min) | Mw (kg/mol) | Mw/Mn | Total wt % $C_2$ (NMR) | Tm (° C.) Peak 1 (Peak 2) | Tc (° C.) | Melt Enthalpy (J/g) |
|---|---|---|---|---|---|---|---|
| CBC1 | 9.8 | 103.6 | 2.73 | 47.6 | 107.9 (130.0) | 87.8 | 95 |

Example 2—Synthesis of CBC2

The crystalline block composite CBC2, which includes 70 wt. % iPP and 30 wt. % EP, was prepared using two continuous stirred tank reactors (CSTR) connected in series, similarly to CBC1. The reactor conditions is described in Table 4. Table 5 shows further analytical characteristics of CBC2.

TABLE 4

Reactor process conditions to produce crystalline block composites CBC2.

| Reactor | CBC2 | |
|---|---|---|
| | 1st Reactor | 2nd Reactor |
| Reactor Control Temp.(° C.) | 120 | 115 |
| Solvent Feed (lb/hr) | 130 | 292 |
| Propylene Feed (lb/hr) | 2.92 | 58.66 |
| Ethylene Feed (lb/hr) | 24.5 | 0 |
| Hydrogen Feed (SCCM) | 9.7 | 9.8 |
| Reactor Propylene Conc. (g/L) | 1.98 | 1.93 |
| Catalyst Efficiency (gPoly/gM) *1.0E6 | 0.738 | 0.081 |
| Catalyst Flow (lb/hr) | 0.89 | 1.79 |
| Catalyst Conc. (ppm) | 40 | 400 |

TABLE 4-continued

Reactor process conditions to produce crystalline block composites CBC2.

| | CBC2 | |
|---|---|---|
| Reactor | 1st Reactor | 2nd Reactor |
| Cocatalyst-1 Flow (lb/hr) | 0.80 | 0.96 |
| Cocatalyst-1 Conc. (ppm) | 600 | 6000 |
| Cocat.-2 Flow (lb/hr) | 0.51 | 0 |
| Cocat.-2 Conc. (ppm) | 3995 | 0 |
| DEZ Flow (lb/hr) | 1.65 | 0.00 |
| DEZ Conc. (ppm) | 30000 | 0 |

TABLE 5

Crystalline block composite physical properties

| | MFR (230° C./ 2.16 kg) | wt. % PP from HTLC Separation | Mw kg/mol | Mw/Mn | Total Wt. % $C_2$ | Tm (° C.) Peak 1 (Peak 2) | Tc (° C.) | Melt Enthalpy (J/g) |
|---|---|---|---|---|---|---|---|---|
| CBC2 | 23.5 | 27.1 | 127 | 4.26 | 28.8 | 136 (105) | 94 | 100 |

Example 3—Crystalline Block Composite Index (CBCI) Calculations

CBCI provides an estimate of the quantity of block copolymer within the CBC under the assumption that the ratio of CEB to CAOB within the diblock is the same as the ratio of ethylene to α-olefin in the overall CBC. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in these examples, the CAOP) and polyethylene (in these examples, the CEP). Consequently, the polyethylene fraction contains an appreciable amount of propylene that would not otherwise be present if the polymer was simply a blend of polypropylene and polyethylene. To account for this "extra propylene," a mass balance calculation can be performed to estimate the CBCI from the amount of the polypropylene and polyethylene fractions and the wt % propylene present in each of the fractions that are separated by HTLC. The corresponding CBCI calculations for CBC 1 and CBC2 are provided in Table 6.

TABLE 6

Crystalline block composite index (CBCI) Calculations

| Line | Variable | Source | CBC1 | CBC2 |
|---|---|---|---|---|
| 1 | Overall wt % C3 Total | Measured | 52.400 | 71.200 |
| 2 | wt % C3 in PP block/polymer | Measured | 99.000 | 99.000 |
| 3 | wt % C3 in PE block/polymer | Measured | 10.500 | 10.500 |
| 4 | wt fraction PP (in block or polymer) | Eq. 6 below | 0.500 | 0.686 |
| 5 | wt fraction PE (in block or polymer) Analysis of HTLC Separation | 1-Line 4 | 0.500 | 0.314 |
| 6 | wt fraction isolated PP | Measured | 0.199 | 0.271 |
| 7 | wt fraction PE fraction | Measured | 0.801 | 0.729 |

TABLE 6-continued

Crystalline block composite index (CBCI) Calculations

| Line | Variable | Source | CBC1 | CBC2 |
|---|---|---|---|---|
| 8 | wt % C3 in PE-fraction | Eq. 8 below | 40.823 | 60.9 |
| 9 | wt fraction PP-diblock in PE fraction | Eq. 10 below | 0.343 | 0.569 |
| 10 | wt fraction CPE in PE fraction | 1-Line 10 | 0.657 | 0.431 |
| 11 | wt fraction diblock in PE fraction | 10/Line 4 | 0.685 | 0.830 |
| 12 | CBCI | Eq. 11 below | 0.549 | 0.605 |

The CBCI is measured by first determining a summation of the weight percent propylene from each component in the polymer according to Equation 5, below, which results in the overall wt % propylene/C3 (of the whole polymer). This mass balance equation can be used to quantify the amount of the PP and PE present in the block copolymer. This mass balance equation can also be used to quantify the amount of PP and PE in a binary blend or extended to a ternary, or n-component blend. For CBC 1, the overall amount of PP or PE is contained within the blocks present in the block copolymer and the unbound PP and PE polymers.

$$wt \%C_{3\ overall} = w_{PP}(wt \%C_{3\ PP}) + w_{PE}(wt \%C_{3\ PE}) \quad (EQ.\ 5)$$

where wPP is the weight fraction of PP in the polymer; wPE is the weight fraction of PE in the polymer; wt %C3 PP is the weight percent of propylene in the PP component or block; and wt %C3 PE is the weight percent of propylene in the PE component or block.

Note that the overall weight percent of propylene (C3) is measured from C13 NMR or some other composition measurement that represents the total amount of C3 present in the whole polymer. The weight percent propylene in the PP block (wt %C3 PP) is set to 100 (if applicable) or if otherwise known from its DSC melting point, NMR measurement, or other composition estimate, that value can be put into its place. Similarly, the weight percent propylene in the PE block (wt %C3 PE) is set to 100 (if applicable) or if otherwise known from its DSC melting point, NMR measurement, or other composition estimate, that value can be put into its place. The weight percent of C3 is shown in Table 6.

Based on Equation 5, the overall weight fraction of PP present in the polymer can be calculated using Equation 6 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the block copolymer. For a conventional blend, the weight fraction of PP and weight fraction of PE corresponds to the individual amount of PP and PE polymer present. For the CBC, it is assumed that the ratio of the weight fraction of PP to PE also corresponds to the average block ratio between PP and PE present in this statistical block copolymer.

$$w_{PP} = \frac{\text{wt \% } C_{3\ overall} - \text{wt \% } C_{3\ PE}}{\text{wt \% } C_{3\ PP} - \text{wt \% } C_{3\ PE}} \quad \text{(EQ. 6)}$$

where $w_{pp}$ is the weight fraction of PP in the polymer; wt %C3 PP is the weight percent of propylene in the PP component or block; and wt %C3 PE is the weight percent of propylene in the PE component or block.

To estimate the amount of the block copolymer (diblock) in the CBC, apply Equations 7 through 9, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP block present in the diblock copolymer. By substituting the overall weight percent C3 of the whole polymer in the left hand side of Equation 7, and the weight fraction of PP (isolated from HTLC) and the weight fraction of PE (separated by HTLC) into the right hand side of Equation 7, the weight percent of C3 in the PE fraction can be calculated using Equations 8 and 9. The PE fraction is described as the fraction separated from the unbound PP and contains the diblock and unbound PE. The composition of the isolated PP is assumed to be the same as the weight percent propylene in the PP block as described previously.

$$\text{wt \% } C_{3\ overall} = \quad \text{(EQ. 7)}$$
$$w_{PP\ isolated}(\text{wt \% } C_{3\ PP}) + w_{PE-fraction}(\text{wt \% } C_{3\ PE-fraction})$$

$$\text{wt \% } C_{3\ PE-fraction} = \frac{\text{wt \% } C_{3\ overall} - w_{PP\ isolated}(\text{wt \% } C_{3\ PP})}{w_{PE-fraction}} \quad \text{(EQ. 8)}$$

$$w_{PE-fraction} = 1 - w_{PP\ isolated} \quad \text{(EQ. 9)}$$

where $w_{PP}$ isolated is the weight fraction of isolated PP from HTLC; $w_{PE-fraction}$ is the weight fraction of PE separated from HTLC, containing the diblock and unbound PE; wt %C3$_{PP}$ is the wt % of propylene in the PP; which is also the same amount of propylene present in the PP block and in the unbound PP; wt %C3$_{PE-fraction}$ is the wt % of propylene in the PE-fraction that was separated by HTLC; and wt %C3 overall is the overall wt % propylene in the whole polymer.

The amount of wt % C3 in the polyethylene fraction from HTLC represents the amount of propylene present in the block copolymer fraction that is above the amount present in the 'unbound polyethylene.' To account for the 'additional' propylene present in the polyethylene fraction, the only way to have PP present in this fraction, is that the PP polymer chain must be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 10.

$$w_{PP-diblock} = \frac{\text{wt \% } C_{3\ PE-fraction} - \text{wt \% } C_{3\ PE}}{\text{wt \% } C_{3\ PP} - \text{wt \% } C_{3\ PE}} \quad \text{(EQ. 10)}$$

where wt %C3$_{pE-fraction}$ is the wt % of propylene in the PE-fraction that was separated by HTLC (Equation 8); wt %C3$_{PP}$ is the wt % of propylene in the PP component or block (defined previously); wt %C3$_{PE}$ is the wt % of propylene in the PE component or block (defined previously); and $w_{pp-diblock}$ is the weight fraction of PP in the diblock separated with PE-fraction by HTLC.

The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus, the weight fraction of diblock present in the PE fraction would be weight fraction of PP in the diblock (wPP-diblock) multiplied by two. Another way to calculate this is by dividing the weight fraction of PP in the diblock ($w_{PP-diblock}$) by the weight fraction of PP in the whole polymer (Equation 6).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by Equation 11. To estimate the CBCI, the weight fraction of diblock in the PE fraction calculated using Equation 10 is divided by the overall weight fraction of PP (as calculated in Equation 6) and then multiplied by the weight fraction of the PE fraction.

$$CBCI = \frac{w_{PP-diblock}}{w_{PP}} \times w_{PE-fraction} \quad \text{(EQ. 11)}$$

where $w_{PP-diblock}$ is the weight fraction of PP in the diblock separated with the PE-fraction by HTLC (Equation 10); $w_{PP}$ is the weight fraction of PP in the polymer; and $w_{PE-fraction}$ is the weight fraction of PE separated from HTLC, containing the diblock and unbound PE (Equation 9).

Example 4—Synthesis of EP1

EP1, which comprises 100% by weight ethylene copolymer, was produced using the same catalyst and cocatalysts as used to produce CBC2, but EP1 was produced in a single reactor. For sample EP1, the final product MFR was regulated by manipulating the DEZ flow. EP1 was produced in a 12 gallon reactor.

TABLE 7

Reactor process conditions to produce EP1 and iPP1.

| Material | EP1 |
| --- | --- |
| Reactor Control Temp. (° C.) | 146 |
| Solvent Feed (lb/hr) | 290 |
| Propylene Feed (lb/hr) | 7.4 |
| Ethylene Feed (lb/hr) | 57.8 |
| Hydrogen Feed (SCCM) | 0 |
| Reactor Propylene Conc. (g/L) | 4.13 |
| Catalyst Efficiency (gPoly/gM)*106 | 1.12 |
| Catalyst Flow (lb/hr) | 0.85 |
| Catalyst Conc. (ppm) | 64.9 |
| Cocatalyst-1 Flow (lb/hr) | 0.55 |
| Cocatalyst-1 Conc. (ppm) | 1000 |
| Cocat.-2 Flow (lb/hr) | 1.40 |
| Cocat.-2 Conc. (ppm) | 3995 |
| DEZ Flow (lb Zn/hr) | 1.68 |
| DEZ Concentration (ppm) | 40,000 |
| Production Rate (lb/hr) | 63.4 |

TABLE 8

Single reactor product physical properties.

| Sample | MFR (230° C./ 2.16 kg) | Mw kg/mol | Mw/Mn | Total wt. % C$_2$ | Tm (° C.) | Tc (° C.) | Melt Enthalpy (J/g) |
|---|---|---|---|---|---|---|---|
| EP1 | 6.2 | 70.6 | 2.06 | 92 | 108 | 92 | 115 |

Example 5—Synthesis of Ionomer 1

To prepare Ionomer 1, the precursor acid copolymers (e.g., the non-neutralized copolymers of ethylene and methacrylic acid) are produced by a free radical polymerization in an adiabatic continuous stirred autoclave, substantially according to the procedure described in Example 1 of U.S. Pat. No. 5,028,674, with the following exceptions: (1) by controlling the ratio of ethylene to methacrylic acid and the flow rate of the initiator, the reactor conditions may be maintained at a temperature of about 200° C. to about 260° C. and at a pressure of between 170 MPa and 240 MPa.; (2) no propane telogen is fed in the reactor; (3) the total concentration of methanol in the reactor may be maintained at about 2 to 5 mol. %, based on the total feed of ethylene, methacrylic acid, methanol and initiator solution; and (4) the system is maintained at a steady state with the residence time of the material flowing through the reactor being from about 5 seconds to about 2 minutes. Tert-butyl peracetate is the initiator that may be utilized as a solution in odorless mineral spirits at 50% concentration.

Example 6—Preparation of Comparative Blends A-C and Inventive Blend 1

The materials used to produce Comparative Blends A-C and Inventive Blend 1 were Ionomer 1 and CBC1, CBC2, and EP1 as previously described. The compositions of Comparative Blends A-C and Inventive Blend 1 are provided in Table 9.

TABLE 9

Composition of Comparatives A-C and Sample 1.

| | |
|---|---|
| Comparative Blend A | 100 wt. % Ionomer 1 |
| Comparative Blend B | 90 wt. % Ionomer 1<br>10 wt. % CBC1 (50/50 EP/iPP, 90 wt. % C2 in EP) |
| Comparative Blend C | 90 wt. % Ionomer 1<br>10 wt. % EP1 (EP single reactor product, 90 wt. % C2) |
| Inventive Blend 1 | 90 wt. % Ionomer 1<br>10 wt. % CBC2 (30/70 EP/iPP, 90 wt. % C2 in EP) |

The formulations of Table 9 are made from a melt extrusion process (twin screw extruder and the barrel temperature is around 210° C.).

Example 7—Analysis of Comparative Blends A-C and Inventive Blend 1

For tensile and HDT testing, the blends were then injection molded into ISO 527 type 1A testing bars. For oven creep testing and internal haze measurements, the formulations were compression molded into 3 in.×1 in.×10 mil. (L×W×T) and 6 in.×6 in.×10 mil. films, respectively. The results are shown below in Tables 10, 11, and 12.

TABLE 10

Internal Haze, Oven Creep Test, and Heat Deflection Temperature Results for Comparative Blends A-C and Inventive Blend 1.

| | Internal Haze (%) | Oven Creep Test (% dimensional change at 150 minutes) | Heat Deflection Temperature (° C.) |
|---|---|---|---|
| Comparative Blend A | 1.8 | 1200%, Failed | 43.2 |
| Comparative Blend B | 23.9 | 1200%, Failed | 45.0 |
| Comparative Blend C | 51.9 | Not tested | Not tested |
| Inventive Blend 1 | 14.3 | 113% | 45.8 |

TABLE 11

Oven Creep Test Results for Comparative Blends A-B and Inventive Blend 1.

| Time (min) | Comparative Blend A | Comparative Blend B | Inventive Blend 1 |
|---|---|---|---|
| 0 | 0% | 0% | 0% |
| 30 | 75% | 75% | 25% |
| 60 | 238% | 1200%, failed | 50% |
| 90 | 350% | n/a | 75% |
| 120 | 475% | n/a | 100% |
| 150 | 1200%, failed | n/a | 113% |
| 180 | n/a | n/a | 113% |
| 210 | n/a | n/a | 125% |
| 240 | n/a | n/a | 125% |

As shown in Table 10, Inventive Blend 1 exhibited much lower internal haze than Comparative Blend B, which only included 50 wt. % iPP and Comparative Blend C, which only included EP copolymer. The internal haze of Comparative Blend C was not acceptable, so the oven creep test and heat deflection temperature were not measured. Additionally, Inventive Blend 1 exhibited a higher heat deflection temperature than Comparative Blend A, which solely included ionomer, and Comparative Blend B. As shown in Tables 10 and 11, for the oven creep test, Inventive Blend 1 exhibited a 113% dimensional change at 150 minutes whereas Comparative Blends A and B both failed.

TABLE 12

Tensile Properties of Comparative Blends A-C and Inventive Blend 1.

| | Tensile Strength (MPa) | Tensile Modulus (MPa) | Elongation at Break (%) |
|---|---|---|---|
| Comparative Blend A | 26.1 | 433 | 166.2 |
| Comparative Blend B | 29.6 | 470 | 206.7 |
| Comparative Blend C | 29.7 | 454 | 205.1 |
| Inventive Blend 1 | 31.2 | 516 | 217 |

As shown in Table 12, Inventive Blend 1 exhibited higher tensile strength, tensile modulus, and elongation at break when compared to Comparative Blends A-C. Therefore, it was observed that Inventive Blend 1, a crystalline block composite having greater than 50 wt. % iPP, allows for a resulting blend, which may exhibit improved thermal, mechanical, and optical properties when compared to blends including block composites having less than or equal to 50 wt. % iPP.

Example 8—Analysis of Refractive Index of Ionomer 1, CBC1, CBC2, and EP1

The refractive indices of the samples were measured using a Metricon model 2010/M prism coupler using a 632.8 nm HeNe laser at ambient temperature and humidity using compression molded plaques (6 mil). Comparative Ionomer A was molded at 190° C., whereas CBC1, CBC2, and EP1 were molded at 210° C. The materials were molded against PET (Mylar) sheet for smooth surface and quench cooling was used. The refractive index of these materials was tested and summarized in Table 13.

TABLE 13

Refractive Index of Ionomer 1, CBC1, CBC2, EP1.

| | Refractive Index (RI) |
|---|---|
| Ionomer 1 | 1.4963 |
| CBC1 | 1.5025 |
| CBC2 | 1.5068 |
| EP1 | 1.5107 |

As shown in Table 13, Ionomer 1, exhibited a refractive index of 1.4963. For EP1, having 0 wt. % iPP, the refractive index was 1.5107. For CBC1 having 50 wt. % iPP, the refractive index was 1.5025. For CBC2, having greater than 50 wt. % iPP (70 wt. % iPP), the refractive index was 1.5068. These results show that including iPP in the samples may result in a refractive index that approaches the refractive index of Ionomer 1. It is believed that the similar refractive indices may allow for improved clarity of the blend.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

The invention claimed is:

1. A polymer blend comprising:
    1 to 40 wt.% of a crystalline block composite comprising an EP-iPP diblock polymer, iPP, and EP, wherein iPP is isotactic polypropylene homopolymer and EP is a copolymer of ethylene and propylene, and wherein the crystalline block composite comprises greater than 65 wt.% iPP; and
    from 60 wt.% to 99 wt.% of an ionomer formed from a partially neutralized precursor acid copolymer, wherein the precursor acid copolymer (a) comprises copolymerized units of ethylene and 5 wt.% to 30 wt.%, based on the total weight of the precursor acid copolymer, of copolymerized units of an α,β-ethylenically unsaturated carboxylic acid having 3 to 8 carbon atoms, and wherein about 25% to about 65% of the acid groups derived from the α,β-ethylenically unsaturated carboxylic acid of the precursor acid copolymer are neutralized.

2. The polymer blend of claim 1, wherein the ionomer has a melt index, $I_2$, (according to ASTM D1238 at 190° C., 2.16 kg) of 0.1 g/10 min to 50 g/10 min.

3. The polymer blend of claim 1, wherein the crystalline block composite has a melt flow rate, MFR, (according to ASTM D1238 at 230° C., 2.16 kg) of 2 g/10 min to 50 g/10 min.

4. The polymer blend of claim 1, wherein the acid groups are neutralized by one or more of a zinc ion-containing base, a magnesium ion-containing base, and a sodium-ion-containing base.

5. The polymer blend of claim 1, wherein the polymer blend comprises 5 to 15 wt.% of the crystalline block composite, and 85 to 95 wt.% of the ionomer.

6. The polymer blend of claim 1, wherein the α,β-ethylenically unsaturated carboxylic acid comprises acrylic acid, methacrylic acid, or combinations thereof.

7. A molded article comprising the polymer blend of claim 1.

8. The molded article of claim 7, wherein the molded article is an injection molded article, or a compression molded article.

9. The molded article of claim 7, wherein the molded article exhibits an internal haze of less than or equal to 20%.

10. The molded article of claim 7, wherein the molded article exhibits an oven creep of less than 150% elongation after 160 minutes.

11. The molded article of claim 7, wherein the molded article exhibits a tensile strength of at least 30 MPa.

12. The molded article of claim 7, wherein the molded article exhibits at a heat deflection temperature (HDT) of greater than 35° C. according ISO 75 using a 0.45 MPa load.

13. The molded article of claim 7, wherein the crystalline block composite exhibits a refractive index (RI) of 1.49 to 1.52.

* * * * *